July 2, 1963    J. F. LAYCAK    3,096,443
ELECTRONIC SURFACE INSPECTION SYSTEM
Filed June 20, 1960    4 Sheets-Sheet 1

INVENTOR
John F. Laycak
BY
ATTORNEY

July 2, 1963 J. F. LAYCAK 3,096,443
ELECTRONIC SURFACE INSPECTION SYSTEM
Filed June 20, 1960 4 Sheets-Sheet 2

INVENTOR
John F. Laycak
BY
ATTORNEY

July 2, 1963 J. F. LAYCAK 3,096,443
ELECTRONIC SURFACE INSPECTION SYSTEM
Filed June 20, 1960 4 Sheets-Sheet 4

INVENTOR
John F. Laycak
BY
ATTORNEY

United States Patent Office 3,096,443
Patented July 2, 1963

3,096,443
ELECTRONIC SURFACE INSPECTION SYSTEM
John F. Laycak, Duquesne, Pa., assignor to Jones & Laughlin Steel Corporation, Pittsburgh, Pa., a corporation of Pennsylvania
Filed June 20, 1960, Ser. No. 37,473
11 Claims. (Cl. 250—219)

This invention relates to a system adapted to inspect the surface of material for imperfections and quality where the imperfections have a different optical appearance than the remainder of the material as, for example, where the imperfections are discernable by differences in color, emitted light, reflected light, or combinations of these. More particularly, the invention relates to a surface inspection system adapted to automatically indicate whether incremental lengths of the material being inspected have a surface quality above or below a predetermined standard.

As an overall object, the present invention seeks to provide a system for inspecting the surface of any material in which defects on the surface have a generally different optical appearance than the remainder of the material. In the case of a reflective surface, defects will generally have a lower light intensity and appear darker than the remainder of the material when light is directed thereon. Similarly, in the case of an irradiant hot object, defects will appear brighter or darker than the main body of the material. These differences in intensity may be converted, by means of a photosensitive device, into electrical current variations which, in turn, may be used to indicate the presence of the defects, or for control purposes. If the defects have a different color than the remainder of the material, suitable filters may be employed whereby only a particular color or colors will activate a photosensitive device to produce an electrical current variation with the same result as that achieved with an irradiant or reflective surface.

Another object of the invention resides in the provision of a surface inspection system for moving material in which the output of the system will always be the same for a given surface imperfection condition regardless of the speed of the material being inspected.

A further object of the invention resides in the provision of a surface inspection system of the type described which will give an indication of the number of defects on the surface of the article being inspected, regardless of the areas of the individual defects detected by the inspection system. Thus, the system will give the same output indication for defects of relatively large area as it will for defects having very small individual areas.

A still further object of the invention is to provide a surface inspection system for moving material which will indicate whether successive incremental lengths of the material being inspected are of passable surface quality.

In accordance with the invention, hereinafter described in detail, the material to be inspected travels over a conveyor. Disposed above the conveyor is an electron-optics pickup device, such as a vidicon, adapted to scan the surface of the material traveling over the conveyor along a line extending substantially perpendicular to the direction of movement of the material. If the material being inspected is hot and irradiant, defects on its surface will appear brighter or darker than the remainder of the material and, thus, will have a different optical appearance. Similarly, if a reflective material is being inspected such as tin plate or stainless steel, the surface of the material may be illuminated by external means along the scanning line of the electron-optics device. In this latter case, defects appearing on the surface of the reflective material will have a lower reflectivity and appear darker. If the material being inspected is such that defects have a different color than the remainder of the material, suitable filters may be disposed between the surface and the electron-optics pickup device whereby a different optical appearance of the defects, as they appear to the pickup device, will be achieved. In any of these cases, the electron beam of the photosensitive pickup device will scan across the surface of the material being inspected to produce a video signal in which a relatively long pulse is produced for each scan of the electron beam, this pulse being produced as the beam scans across the image of the illuminated or irradiant surface of the body. Superimposed on this long pulse are short pulses which arise when the electron beam scans over the image of defects of different optical appearance, the width of each pulse being proportional to the width, along the scanning line, of the defect it represents. The video signal, after suitable shaping, is differentiated to produce a short spiked pulse of one polarity at one edge of each pulse in the video signal and a short spiked pulse of the opposite polarity at the other edge of each pulse in the original video signal. By eliminating the spiked pulses of one polarity, only a single spiked pulse will remain in the resultant signal for each pulse in the original video signal. Thereafter, by eliminating the spiked pulse due to the relatively long pulse produced when the electron beam scans over an image of the surface being inspected, only those spiked pulses due to defects will remain. Thus, by counting the remaining spiked pulses, an indication of the condition of the surface of the material being inspected will be obtained.

It will be apparent that if the electron beam of the photosensitive device scans along the aforesaid fixed line at a constant sweep frequency, the total number of defect pulses produced for any given length of the material will be a function of its speed. That is, if the material travels along its conveyor at a high rate of speed, a fewer number of defect pulses will be produced during one foot of travel than would be produced for the same foot of travel if the speed of the body were decreased. Since it is desired to obtain an indication of the number of defects over a given length of the body, and since the number of defect pulses is dependent upon the speed of the body, some means must be provided to insure that the number of defect pulses fed to the counter will be the same for a particular length of the material regardless of its speed. Otherwise, the output of the counter will not be a true indication of the total number of defects.

Accordingly, in one embodiment of the invention described herein, a gating signal is produced having a number of pulses therein proportional to the speed of the material being inspected. By gating the defect pulses with this gating signal prior to their being fed to the aforesaid counter, only a number of the defect pulses proportional to the speed of the body will be fed to the counter. Thus, if the material is traveling rapidly, a greater number of defect pulses will be fed to the counter over a given time interval than will be fed over the same time interval when the speed of the material is decreased. In this manner, the number of defect pulses fed to the counter will always be the same for a given defect condition regardless of speed.

In another embodiment of the invention, speed compensation is achieved by regulating the sweep repetition rate of the electron beam of the photosensitive pickup device whereby it is proportional to the speed of the material being inspected. In this manner, the defect pulses reaching the counter will again always be the same regardless of the speed of the material.

The above and other objects and features of the invention will become apparent from the following detailed description taken in connection with the accompanying drawings which form a part of this specification and in which.

Figure 1:
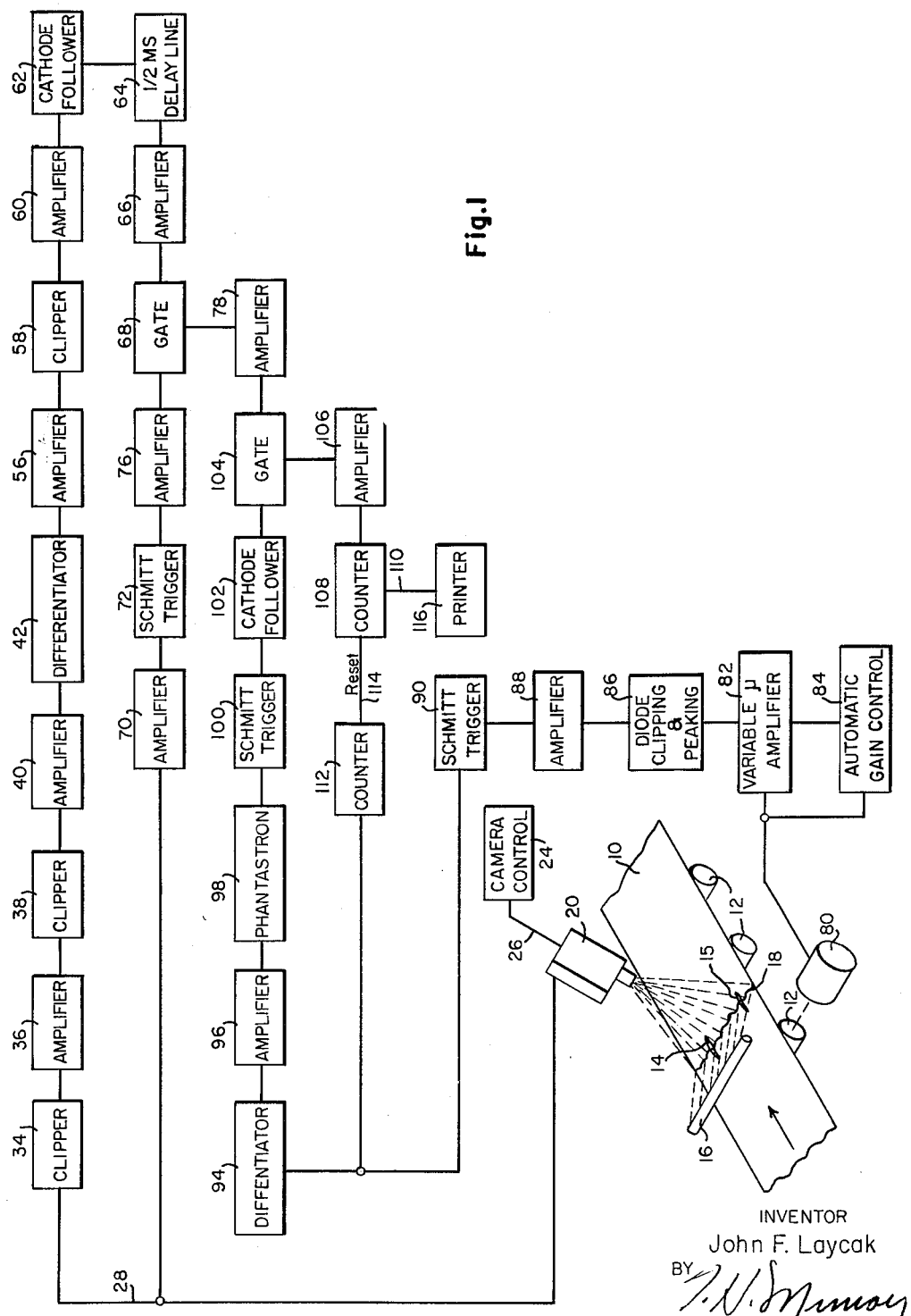
FIG. 1 is a schematic block diagram of one embodiment of the invention wherein speed compensation is achieved by means of gating pulses having a recurrence frequency proportional to the speed of the material being inspected.
Figure 3:
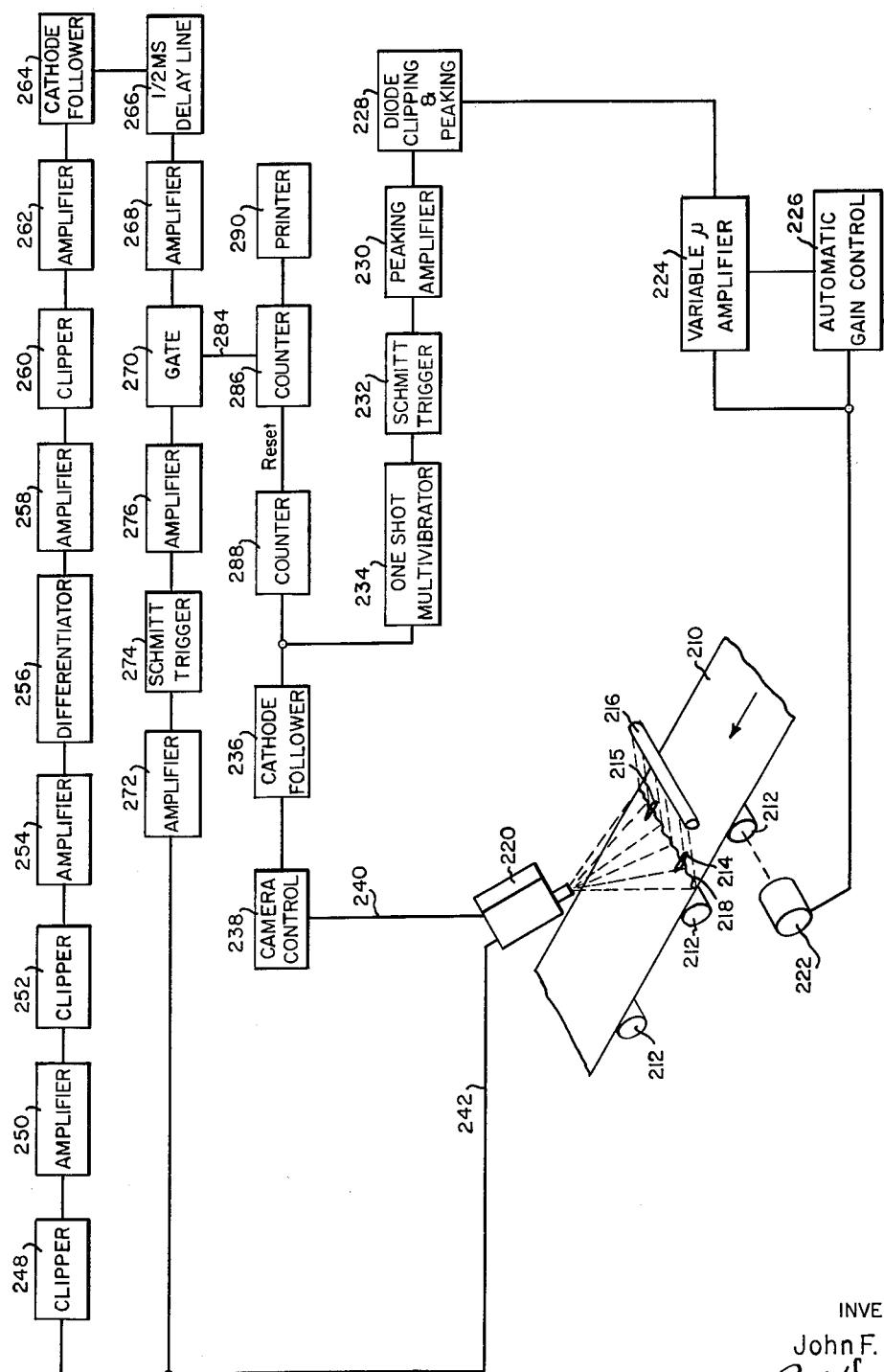
FIG. 3 is a schematic block diagram of another embodiment of the invention wherein speed compensation is achieved by regulating the sweep repetition frequency of the electron-optics pickup device.

With reference to FIGS. 1 and 3, it will be noted that all of the individual circuits such as amplifiers, gates, multivibrators and the like are illustrated in block form. The detailed construction and operation of each of these circuits may be found by reference to almost any standard electronics text book; however, if desired, reference may be had to either one of the following pending United States patent applications for a showing and description of the details of the various individual circuits: application Serial No. 827,315, now Patent No. 3,020,33, "Inspection and Control System," filed July 15, 1959; or application Serial No. 854,908, now Patent No. 3,020,034, "Inspection and Control System," filed November 23, 1959, both applications being assigned to the assignee of the present application.

Figure 2:
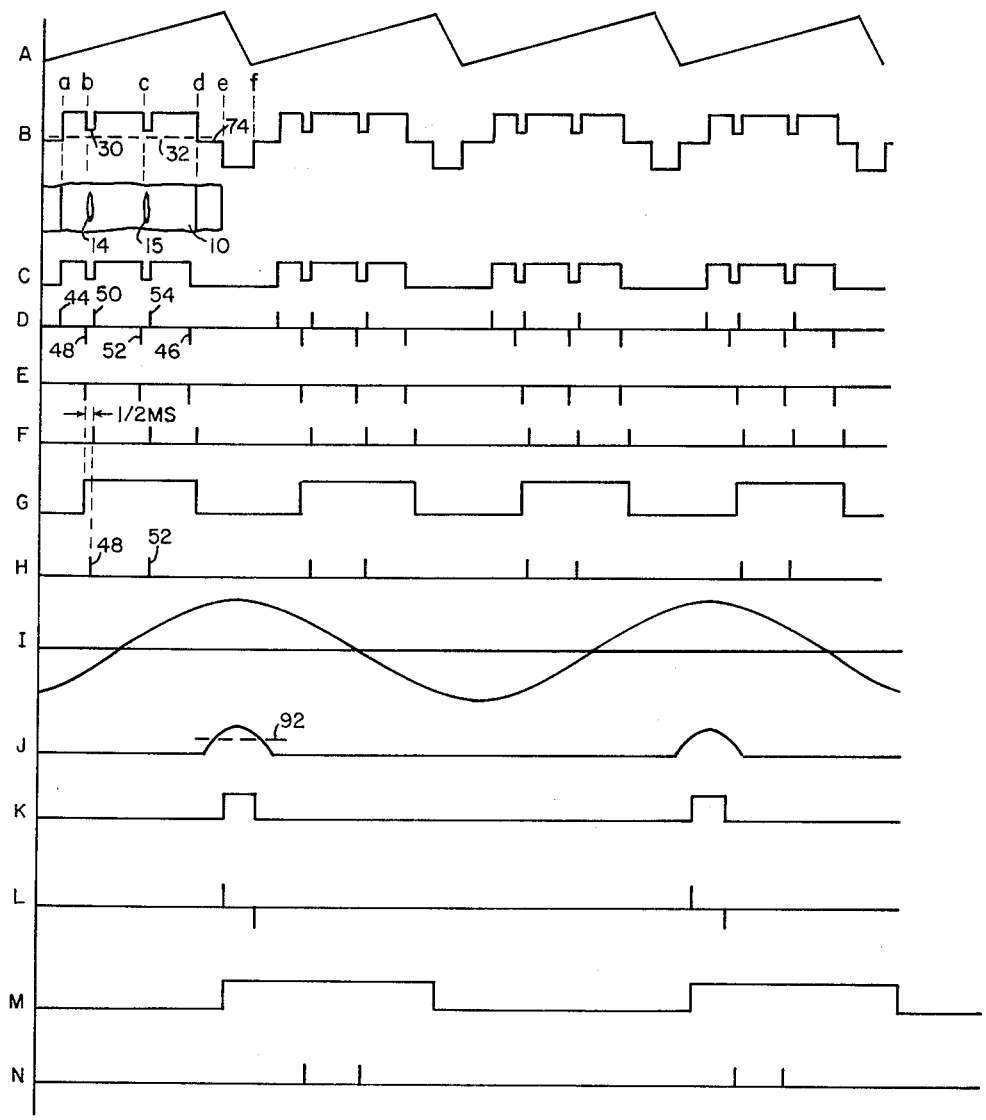
FIG. 2 illustrates wave forms appearing at various points in the circuit of FIG. 1.

Referring now to FIG. 1 in detail, a continuous length of reflective strip material 10, such as tin plate, is illustrated as passing over a series of conveyor rolls 12. On the surface of strip 10 are defects 14 and 15 which have a lesser reflectivity than the remainder of the material; and in the case of tin plate, the defects may comprise pin holes or other surface blemishes. Disposed above strip 10 is a fluorescent lamp 16 or the like which directs a narrow beam of light 18 onto the surface of the strip 10 along a path extending substantially perpendicular to the direction of movement of the strip. If the material being inspected is hot and irradiant, then the fluorescent lamp 16 may be eliminated since the irradiant material will itself glow or give off light while defects on its surface will appear brighter or darker than the remainder of the material. Disposed above the material 10 is a television camera tube 20 which may, for example, incorporate a vidicon or other similar photosensitive pickup device which scans an image of the surface of the strip 10 with an electron beam along the path 18. The camera 20 is controlled by camera control circuit 24 which produces a sawtooth wave form of constant frequency. The signal at the output of circuit 24 thus appears as wave form A in FIG. 2 and comprises a series of rising current excursions which cause the electron beam of the camera to sweep across the surface of the strip along path 18 and then return to its initial position during a dwell time when the wave form A returns to its initial current level. The wave form A is fed to the camera 20 via lead 26, while the video output wave form from the camera, illustrated as wave form B in FIG. 2, appears on lead 28. As shown in FIG. 2, this video wave form is a series of relatively long pulses having superimposed thereon short pulses indicating the presence of defects. It will be apparent from wave form B that as the electron beam sweeps from one side of the conveyor to the other, it will first scan the dark background portion of the conveyor until it reaches point a which is the edge of the strip 10. After intersecting the edge of the strip, the voltage of the video wave form increases because of the greater light intensity of the strip. At point b, the electron beam intersects a defect 14 having a lesser reflectivity than the remainder of the strip. Consequently, a negative pulse 30 is produced in the wave form. At point c the vidicon electron beam intersects defect 15 to produce a second negative short pulse 32 in the wave form. Finally, at point d in the wave form the electron beam leaves the edge of the strip and the voltage decreases due to the dark background of the conveyor. Between points e and f, the electron beam returns to its original starting position over a very short interval of time, and the cycle is repeated.

Reverting again to FIG. 1, from lead 28 the wave form B is passed through a first clipper 34 and a first amplifier 36 to a second clipper 38 and a second amplifier 40. The function of the first clipper 34 is to remove the lower portion of the video wave form B so that only the pulse between points a and d remains. Circuit 36 amplifies the wave form and clipper 38 further refines the clipping action so as to insure that clean pulses of high amplitude appear at the output of amplifier 40. These pulses, then, appear as wave form C in FIG. 2 and are passed to a differentiator 42. As is well known to those skilled in the art, a differentiator is a circuit in which the voltage amplitude at the output is proportional at any instant to the rate of change of voltage amplitude at the input. The voltage wave form appearing at the output of the differentiator will, therefore, be a series of sharp voltage pulses which occur in time at the points where the input square wave signal changes from one voltage level to another. This wave form is illustrated as wave form D in FIG. 2. As the input voltage changes in a positive direction, the sharp pulse produced by the differentiator is also positive, while a negative sharp pulse is produced by the differentiator when the input voltage changes in a negative direction. In this manner, a sharp positive pulse, as well as a sharp negative pulse, is produced in wave form D for each of the pulses in wave form C. Pulses 44 and 46 are those due to the relatively long pulse or pedestal in wave form C; pulses 48 and 50 are those due to pulse 30 in wave form C; while pulses 52 and 54 are those due to pulse 32. Wave form D at the output of differentiator 42 is thereafter passed through amplifier 56 to a clipper 58 which removes the positive pulses 44, 50 and 54 to produce wave form E wherein only the negative sharp pulses 48, 52 and 46 remain. These pulses are inverted in amplifier 60 and passed through cathode follower 62 to a one-half microsecond delay line 64 which delays the pulses to produce wave form F. This wave form, after passing through amplifier 66, is fed to gate circuit 68.

Reverting again to the television camera 20, its output video wave form B on lead 28 is also passed through amplifier 70 to a Schmitt trigger circuit 72. As is well known, the Schmitt trigger circuit 72 is a multivibrator having two electron valves therein, only one of which conducts at any one time. The multivibrator may be switched from one of its two conducting states to the other whenever an input signal applied thereto exceeds a predetermined voltage level. This voltage level is indicated at 74 on wave form B in FIG. 2. Thus, the output voltage of the Schmitt trigger will rise at the leading edge of each relatively long pulse or pedestal in wave form B and will fall at its tailing edge to produce a series of pulses appearing as wave form G in FIG. 2. Each of the pulses in wave form G, it will be noted, have the same pulse width and phase position as a corresponding pedestal in wave form B. These pulses are passed through amplifier 76 to gate circuit 68. By gating wave form F from amplifier 66 with wave form G from amplifier 76, only those pulses in wave form F which coincide with a pulse in wave form G will pass through amplifier 78. From an examination of FIG. 2, it will be noted that since wave form E was delayed by one-half microsecond to produce wave form F, the pulse 46 due to the trailing edge of the pedestal in the original video wave form does not coincide with a pulse in wave form G. Consequently, pulse 46 is eliminated in the gate circuit 68 whereby wave form H is applied to amplifier 78, this wave form containing only the pulses 48 and 52 which were produced by the defects 14 and 15. It is, therefore, apparent that a single spiked pulse will appear at the output of amplifier 78 for each defect scanned by the electron beam of the television camera 20.

Since the electron beam of the vidicon or other photosensitive device in camera 20 sweeps across the surface of strip 10 at a constant sweep frequency, the number of defect pulses appearing in wave form H will be a function of the speed of the strip. That is to say, most of the defects appearing on the surface of the strip 10 will have a certain length so that the number of defect pulses which each defect produces as it passes underneath the scanning electron beam will be a function of the time required for that defect to pass through the light beam extending along path 18. For that matter, defect pulses will continue to be produced in wave form H even though the strip 10 is stopped. Consequently, in order to obtain a true indication of the surface condition of strip 10, some means must be incorporated into the circuit to compensate for variations in the strip speed.

To this end, circuitry including a tachometer 80 is provided. This tachometer is connected to one of the conveyor rolls 12 and will produce output wave form I in FIG. 2 which is a sine wave signal having a frequency proportional to the speed of the strip 10. That is, as the speed of the strip increases, the frequency of the sine wave will also increase, and vice versa. This sine wave is fed to a variable gain amplifier 82 as well as an automatic gain control circuit 84 which controls the amplitude of the output of amplifier 82. Since the amplitude of the sine wave from tachometer 80 will increase as its speed increases, the automatic gain control circuit 84 will automatically compensate for this increase to maintain the output of amplifier 82 at a substantially constant amplitude. From amplifier 82, the wave form is fed to clipper 86 which eliminates the negative half cycles of the sine wave and peaks the positive half cycles to produce wave form J in FIG. 2. This wave form is passed through amplifier 88 to a second Schmitt trigger circuit 90 which is identical in operation to the Schmitt trigger circuit 72 already described. The circuit 90 is adjusted whereby it will switch from one state of conduction to the other whenever the input signal (i.e., wave form J) rises above voltage level 92 shown in FIG. 2. Thus, the output of the Schmitt trigger circuit 90 will appear as wave form K which is a series of square wave pulses each of which has a pulse width slightly smaller than the width of the pulses in wave form J.

From Schmitt trigger circuit 90, wave form K is passed to differentiator 94 which will produce sharp, spiked pulses at the leading and trailing edges of each pulse in wave form K to produce wave form L in FIG. 2. The pulses in wave form L are passed through amplifier 96 to a phantastron circuit 98. The phantastron circuit, well known in the art, is one which will produce an output pulse of fixed width in response to an input trigger pulse, with the leading edge of the output pulse coinciding with the leading edge of the input pulse. Thus, the output of phantastron 98 will appear as wave form M wherein a pulse is produced for each positive spiked pulse in wave form L, with the leading edge of the pulses in wave form M coinciding with the positive spiked pulses in wave form L. The wave form M is refined or shaped in Schmitt trigger circuit 100 and passed through cathode follower circuit 102 to a gate circuit 104. As shown, signals from amplifier 78 are also fed to the gate circuit 104. It will be remembered that the output of amplifier 78 is wave form H. Thus, wave form H is gated with wave form M to produce wave form N wherein positive spiked pulses are produced only upon coincidence of pulses in wave form H with those in wave form M.

Since the number of pulses in wave form M (i.e., the pulse recurrence frequency) is proportional to the speed of strip 10, the number of pulses appearing in wave form N will also be proportional to speed for a given defect condition.

As long as the electron beam of the camera 20 sweeps over defects on the surface of strip 10, wave form H will be produced at the output of amplifier 78. This wave form will appear regardless of the speed of the strip 10, just so long as the electron beam scans a defect. For that matter, the wave form will appear even if the slab is stopped while defects are located below the scanning line of the camera. The wave form M at the output of cathode follower 102, however, will be produced only while the strip 10 is moving since it depends upon the frequency of the output of tachometer 80. Furthermore, the frequency of the pulses in wave form M depends upon the speed of the strip when it is moving. Thus, if the speed of the strip were doubled over that assumed for the wave forms given in FIG. 2, then four pulses would appear in wave form M rather than the two shown. It is, therefore, evident that if the speed of the strip 10 were doubled, the number of pulses in wave form H which would be passed through gate 104 and appear in wave form N would also be doubled for the time interval shown. As the strip travels through a one-foot interval, for example, the number of pulses reaching gate 104 will be the same for a given total defect area regardless of the speed of the strip 10, the only difference being that if the speed of the strip is increased, the time interval required for a given number of pulses to arrive at gate 104 is decreased.

The pulses at the output of gate 104, being proportional to the number of defects on strip 10, are passed through amplifier 106 to a counter 108. The counter 108 may be any of the well known types adapted to produce an output pulse on lead 110 in response to a predetermined number of pulses from the amplifier 106. Such counters usually comprise a plurality of cascaded multivibrator circuits which may or may not include appropriate feedback loops in order to obtain the desired count. Thus, if the counter 108 is set to count 10,000 pulses, then an output pulse will appear on lead 110 in response to every 10,000 input pulses from amplifier 106.

In most cases it will be desired to inspect strip 10 in successive increments of equal length to determine whether or not the surface quality of each increment is passable. Therefore, some means must be provided to reset the counter 108 to start counting from zero each time the strip 10 passes through, say, five feet. For this purpose a second counter 112 is provided which counts the pulses in wave form K at the output of Schmitt trigger 90, these pulses being proptional to the speed of slab 10. The counter 112 may be similar to the counter 108 to produce an output pulse on lead 114 in response to a predetermined number of input pulses from circuit 90. Thus, if the Schmitt trigger 90 will produce 15,000 pulses each time the strip 10 passes through five feet, then the counter 112 may be set to count 15,000 pulses whereby it will produce a reset pulse on lead 114 each time the strip 10 passes through five feet. If the counter 108 did not count its 10,000 pulses before receiving the reset pulse from counter 112, then it will have to begin counting again from zero. In this manner, each five-foot length of the strip 10 will be indicated as being of passable or nonpassable surface quality, depending upon whether or not a pulse is received on lead 110 to actuate a printer 116. If a pulse is received on lead 110 indicating an inferior surface condition of a particular five-foot length of strip 10, the printer 116 will so indicate on a record sheet. If, on the other hand, 10,000 pulses are not counted by the counter 108 during a five-foot travel of the strip 10, then the printer 116 will not be actuated to indicate that particular five-foot length is of passable surface quality. When a new strip of material to be inspected is initially passed beneath the camera 20, the counters 108 and 112 will, of course, have to be reset to begin counting from zero. This may be done manually or by means of a photocell circuit which senses the leading edge of the entering strip material and resets the counters. Such a photocell circuit is described and shown, for example, in my copending application Serial No. 862,676, filed December 29, 1959, now Patent No. 2,999,944, and assigned to the assignee of the present application.

Another embodiment of the invention is shown in FIG. 3; however, in this case speed compensation is obtained by varying the sweep repetition rate of a scanning TV camera 220. As was the case with the embodiment shown in FIG. 1, a strip 210 of reflective material passes over conveyor rolls 212 and beneath a fluorescent tube 216 or the like which directs a beam of light on the strip 210 along a path 218 extending substantially perpendicular to its direction of travel. Defects 214 and 215 will again have a lesser reflectivity than the remainder of the strip 210. Connected to one of the conveyor rolls 212 is a tachometer generator 222 which produces a sine wave output appearing as wave form A' in FIG. 4, this sine wave having a frequency proportional to the speed of strip 10. Wave form A' is fed to a variable gain amplifier 224 as well as an automatic gain control circuit 226. As was the case with the embodiment shown in FIG. 1, circuit 226 serves to maintain the amplitude of the sine wave constant regardless of the speed of strip 210. From amplifier 224 the sine wave is passed to diode clipping and peaking circuit 228 to produce wave form B' in FIG. 4 wherein the negative half cycles of the sine wave are removed and the positive half cycles are peaked. Further peaking and amplification are achieved in circuit 230 to produce wave form C' in FIG. 4. This wave form is passed to Schmitt trigger circuit 232 to produce wave form D' which comprises a series of square wave pulses having a pulse recurrence frequency proportional to the frequency of the since wave output of tachometer generator 222. The square wave pulses in wave form D' are then passed to one-shot multivibrator 234 to produce wave form E' in FIG. 4. This wave form is passed through cathode follower 236 to the camera control circuit 238.

Figure 4:
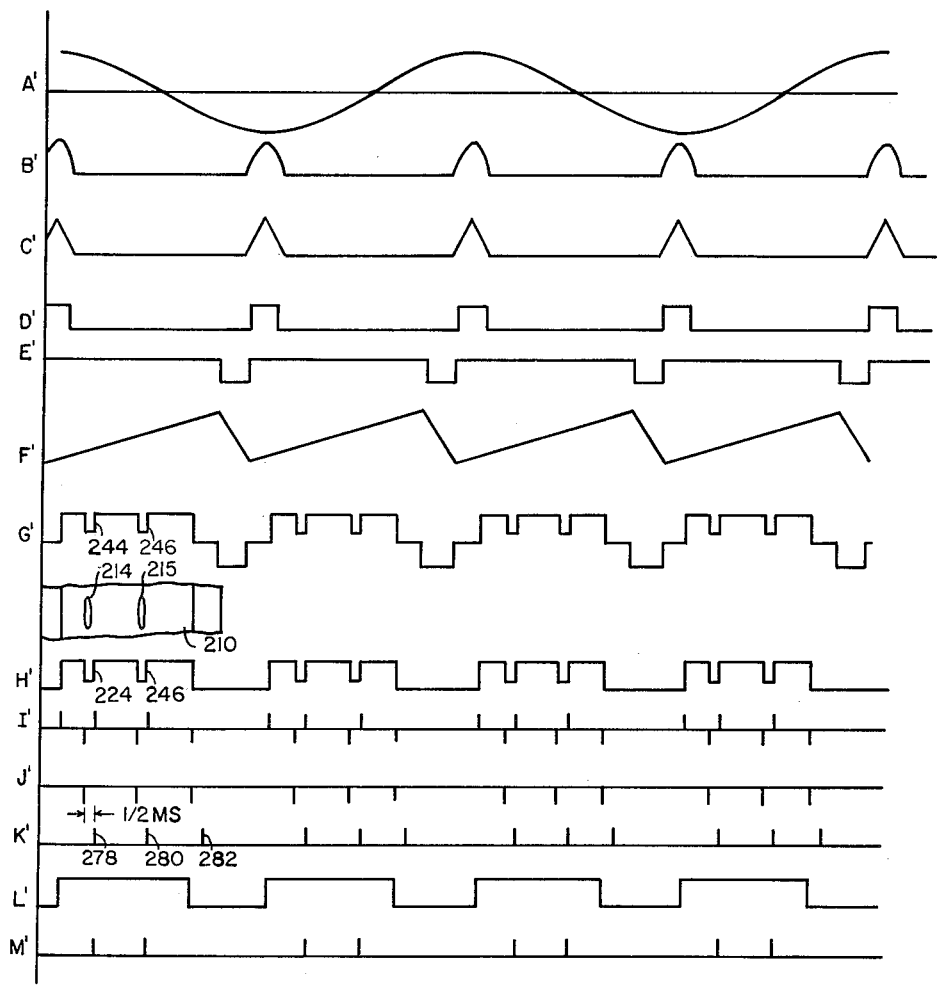
FIG. 4 is an illustration of wave forms appearing at various points in the circuit of FIG. 3.

The camera control circuit 238 will produce the sawtooth wave form F' shown in FIG. 4. As in the embodiment of the invention first described, this wave form is a series of rising current excursions which cause the electron beam of the camera 220 to sweep across the surface of the slab and then return to its initial position during a dwell time when the wave form F' returns to its initial current level. In this case, however, the repetition rate of the rising current excursions will vary as the speed of strip 210 varies. It will be noted that the length of each rising current excursion in wave form F' is equal to the width of a pulse in wave form E', this width being fixed by the one-shot multivibrator 234. The length of the dwell time between successive current excursions in wave form F', however, depends upon the spacing between pulses in wave forms B', C' and D'; and this spacing, in turn, depends upon the frequency of the sine wave A' and the speed of strip 210. In this respect, it will be apparent that as the strip 210 slows down and the frequency of wave form A' decreases, the spacing between pulses in wave forms B', C' and D' will increase so that the spacing between pulses in wave form E' will also increase. In addition, the dwell time between successive current excursions in wave form F' will increase, but the time duration of each excursion will remain the same since this is fixed by the period of one-shot multivibrator 234.

The wave form F' is fed to the camera 220 through lead 240 while the video wave form, illustrated as wave form G' in FIG. 4, appears on lead 242. Wave form G' in FIG. 4 is, of course, similar to wave form D of FIG. 2 and comprises a series of relatively long pulses having superimposed thereon short pulses indicating the presence of defects. Defect 214 on the strip 210 will produce a superimposed short pulse 244 in wave form G' for each scan cycle of the camera; while defect 215 will produce short pulse 246 for each cycle of the camera. Wave form G', after passing through clipper 248, amplifier 250, a second clipper 252 and a second amplifier 254, will appear as wave form H' in FIG. 4 wherein the lower portion of the video wave form is removed to leave only the relatively long pedestals and the defect pulses 244 and 246 superimposed thereon. Wave form H' is then passed to differentiator 256 which produces a sharp spiked pulse of one polarity at the leading edge of each pulse in wave form H' and a sharp spiked pulse of the opposite polarity at the trailing edge of each pulse in the wave form. Thus, the output of the differentiator will now appear as wave form I' in FIG. 4. After passing through amplifier 258, this wave form is fed to clipper 260 which removes the positive spiked pulses in wave form I' to produce wave form J' wherein only the negative spiked pulses remain with one spiked pulse being produced for each pulse in wave form H'. In order to remove the spiked pulse due to the relatively long pedestal in wave form H', the wave form J' is inverted in amplifier 262 and passed through cathode follower 264 to a one-half microsecond delay line 266 which delays the inverted wave form J' by one-half microsecond to produce wave form K'. This wave form, after passing through amplifier 268, is fed to gate circuit 270.

As was the case with the embodiment of the invention shown in FIG. 1, the wave form on lead 242, in addition to being passed to clipper 248, is applied to an amplifier 272, the output of the amplifier being amplified wave form G' in FIG. 4. This wave form, after passing through Schmitt trigger 274 and amplifier 276, appears as wave form L' in FIG. 4 which comprises a series of relatively long pulses each having a pulse width equal to that of the voltage pedestals in wave form G' and a pulse recurrence frequency equal to the sweep repetition frequency of the electron beam in camera 220. Wave form K' is gated with wave form L' in gate 270, the arrangement being such that the gate will conduct to produce an output pulse only upon coincidence of a pulse in wave form K' with a pulse in wave form L'. It will be seen from FIG. 4 that pulses 278 and 280 due to defects will coincide with a pulse in wave form L' and appear at the output of gate circuit 270. The pulse 282 due to the trailing edge of the pedestal in the original video signal, however, does not coincide with a pulse in wave form L' so that it is eliminated. Consequently, only those pulses due to defects appear in wave form M' at the output of gate circuit 270; and the number of those pulses will be the same for any defect condition regardless of the speed of the body. Wave form M' is then fed via lead 284 to a counter 286 which may be identical to the counter 108 shown in FIG. 1. Similarly, counter 288 serves to reset counter 286 after the strip 210 passes through a predetermined distance whereby a printer 290 will indicate whether or not the successive lengths of the strip are of passable surface quality.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In apparatus for detecting flaws on the surface of moving material in which the flaws have a different optical appearance than the remainder of the material, the combination of means including an electron-optics device for scanning an image of the surface of said material with an unmodulated electron beam along a line extending substantially perpendicular to the direction of movement of the material to produce a pulsed signal in which a pulse is produced each time the electron beam scans over the image of a defect, means responsive to the speed of said moving material for gating said pulsed signal to eliminate a portion of the pulses therein and produce a resultant signal, the portion of the pulses eliminated being a function of the speed of said material, and means for counting the pulses in said resultant signal.

2. In apparatus for detecting flaws on the surface of moving material in which the flaws have a different optical appearance than the remainder of the material, the combination of means including an electron-optics device for scanning an image of the surface of said material with an unmodulated electron beam along a line extending substantially perpendicular to the direction of movement of the material to produce a pulsed signal in which a pulse is produced each time the electron beam scans over the image of a defect, means responsive to the speed of said moving material for gating said pulsed signal to eliminate a portion of the pulses therein and produce a resultant signal, the portion of the pulses eliminated being a function of the speed of said material, a counter for counting the pulses in said resultant signal, and a device responsive to movement of said moving material for resetting said counter each time the material has moved through a predetermined distance.

3. In apparatus for detecting flaws on the surface of moving material in which the flaws have a different optical appearance than the remainder of the material, the combination of means including an electron-optics device for periodically scanning an image of the moving material with an unmodulated electron beam along a line extending substantially perpendicular to the direction of movement of the material to produce a pulsed signal in which a pulse is produced each time the electron beam scans over the image of a defect, means responsive to the speed of said moving material for producing a second pulsed signal in which successive pulses all have the same pulse width, the pulse occurrence frequency of pulses in said second signal being proportional to the speed of said material, a coincidence stage for gating said first signal with the second signal to produce output pulses only upon coincidence of pulses in said first signal with pulses in the second signal, and means for counting said output pulses.

4. The combination claimed in claim 3 and including apparatus responsive to movement of said material for resetting the counting means each time the material moves through a predetermined distance.

5. In apparatus for detecting flaws on the surface of moving material in which the flaws have a different optical appearance than the remainder of the material, the combination of means for generating a sine wave signal having a frequency proportional to the speed of said moving material, apparatus responsive to said sine wave signal for generating a train of square wave voltage pulses having a pulse repetition frequency proportional to the frequency of said sine wave, means for scanning an image of the surface of said material with an unmodulated electron beam, apparatus coupled to said scanning means and responsive to said train of square wave voltage pulses for sweeping said electron beam across said image of the surface of said material at a recurrence frequency proportional to the pulse repetition frequency of said train of square wave voltage pulses, means coupled to the output of said scanning means for producing a pulsed signal in which a pulse is produced each time the electron beam scans over the image of a defect, and means for counting the pulses in said pulsed signal to obtain an indication of the surface condition of said material.

6. In an inspection system for detecting defects on the surface of moving material in which the defects have a different optical appearance than the remainder of the material, the combination of means including an electron-optics device for scanning an image of the surface of said material with an unmodulated electron beam to thereby produce a video signal in which each scanning cycle of the electron beam produces a relatively long pulse of one polarity having superimposed thereon short pulses produced when the electron beam scans over a defect image, a differentiator responsive to said video signal for producing a spiked positive pulse at one edge of each pulse in the video signal and a spiked negative pulse at the other edge of each pulse in the video signal, clipping means for eliminating the spiked pulses of one polarity from the differentiated signal to produce a train of pulses in which only one spiked pulse remains for each pulse in the original video signal, means for eliminating the single spiked pulse in said train of pulses due to said relatively long pulse in the original video signal, and a counter for counting the pulses appearing at the output of said last-named means.

7. In an inspection system for detecting defects on the surface of material in which the defects have a different optical appearance than the remainder of the material, the combination of means including an electron-optics device for scanning an image of the surface of said body with an unmodulated electron beam to thereby produce a video signal in which each scanning cycle of the electron beam produces a relatively long pulse of one polarity having superimposed thereon short pulses produced when the electron beam scans over a defect image, means including a differentiator responsive to said video signal for producing a single spiked pulse for each pulse in the original video signal, means for eliminating the single spiked pulse in said differentiated signal due to said relatively long pulse in the original video signal, and a counter for counting the spiked pulses appearing at the output of said last-named means.

8. In an inspection system for detecting defects on the surface of material in which the defects have a different optical appearance than the remainder of the material, the combination of means including an electron-optics device for scanning an image of the surface of said material with an unmodulated electron beam to thereby produce a video signal in which each cycle of the electron beam produces a relatively long pulse of one polarity having superimposed thereon short pulses produced when the electron beam scans over a defect image, means including a differentiator responsive to said video signal for producing a single spiked pulse for each pulse in the original video signal, means for delaying said spiked pulses by a predetermined amount, apparatus responsive to said video signal for producing a train of pulses in which the pulses having the same pulse width and recurrence frequency as said relatively long pulses in the video signal, means for gating said delayed spiked pulses with said train of pulses whereby the spiked pulse due to the relatively long pulse in said video signal is eliminated, and means for counting the pulses at the output of said gating means.

9. In an inspection system for detecting defects on the surface of material in which the defects have a different optical appearance than the remainder of the material, the combination of means including an electron-optics device for scanning an image of the surface of said material with an unmodulated electron beam to thereby produce a video signal in which each cycle of the electron beam produces a relatively long pulse of one polarity having superimposed thereon short pulses produced when the electron beam scans over a defect image, a differentiator responsive to said video signal for producing a spiked positive pulse at one edge of each pulse in the video signal and a spiked negative pulse at the other edge of each pulse in the video signal, clipping means for eliminating the spiked pulses of one polarity from the differentiated signal to produce a train of pulses in which only one spiked pulse remains for each pulse in the original video signal, apparatus responsive to said video signal for producing a pulsed signal in which the pulses have the same pulse width and recurrence frequency as said relatively long pulses in the video signal, means for delaying said train of spiked pulses by a predetermined amount, means for gating said delayed spiked pulses with said latter-mentioned pulsed signal whereby the spiked pulse due to the relatively long pulse in said video signal is eliminated from said train of spiked pulses, a counter for counting the pulses appearing at the output of said gating means, and means responsive to movement of said material for resetting said counter each time the material moves through a predetermined distance.

10. The combination claimed in claim 9 in which the scanning frequency of said electron beam is proportional to the speed of said moving material.

11. The combination claimed in claim 9 and including apparatus responsive to the speed of said moving material for eliminating a portion of the pulses at the output of said gating means which is proportional to the speed of said moving material.

References Cited in the file of this patent

UNITED STATES PATENTS

| | | |
|---|---|---|
| 2,184,157 | Jones | Dec. 19, 1939 |
| 2,184,159 | Stockbarger et al. | Dec. 19, 1939 |
| 2,261,192 | Townsend | Nov. 4, 1941 |
| 2,276,565 | Crosby | Mar. 17, 1942 |
| 2,393,631 | Harrison et al. | Jan. 29, 1946 |
| 2,494,441 | Hillier | Jan. 10, 1950 |
| 2,648,723 | Goldsmith | Aug. 11, 1953 |
| 2,661,902 | Wolff et al. | Dec. 8, 1953 |
| 2,731,202 | Pike | Jan. 17, 1956 |
| 2,756,627 | Boycks | July 31, 1956 |
| 2,819,399 | Teltscher | Jan. 7, 1958 |
| 2,907,519 | Covely | Oct. 6, 1959 |
| 2,910,908 | Meyer | Nov. 3, 1959 |
| 2,927,219 | Young et al. | Mar. 1, 1960 |
| 3,019,972 | Strother | Feb. 6, 1962 |

FOREIGN PATENTS

| | | |
|---|---|---|
| 747,558 | Great Britain | Apr. 11, 1956 |